2,796,415

RED AZO PIGMENTS OF IMPROVED TRANSPARENCY

Thomas E. Ludwig and Oswald E. Knapp, Chicago, Ill., assignors to The Sherwin-Williams Company, Cleveland, Ohio, a corporation of Ohio No Drawing. Application January 19, 1955,
Serial No. 482,878

6 Claims. (Cl. 260—197)

This invention relates to red azo pigments having a strong yellow undertone and improved transparency which pigments are particularly suited for use in printing inks.

The pigments of this invention comprise, broadly, the alkali and alkaline earth metal salts of the coupling of 2-chloro-5-aminoisopropylbenzene-4-sulfonic acid and beta-naphthol, but the invention is primarily concerned with the barium salt of the aforesaid coupling.

An early homologue of the coupling of interest is described in U. S. Patent No. 733,280 of July 7, 1903, to Schirmacher which describes the alkaline earth salts of the coupling of 2-chloro-5-amino methyl benzene-4-sulfonic acid with beta-naphthol. Schirmacher's pigment, which we hereinafter refer to as Methyl Red, has as the barium salt acceptable light-fastness, and is commonly recognized as a relatively yellow shade of red. However, a need has long existed for a pigment of a more markedly yellow undertone and improved transparency.

More recently, U. S. Patent No. 2,598,483, issued to Adams, disclosed a pigment said to possess excellent light-fastness and a shade of red having a more yellow undertone than the pigment of Schirmacher. Adams' pigment is produced by forming similar metal salts to those of Schirmacher of the coupling of 2-chloro-5-aminoethyl-benzene-4-sulfonic acid with beta-naphthol, which is, as can be seen, the next higher homologue of the pigment disclosed in U. S. 733,280. The pigmentary products of Adams are herein referred to as Ethyl Red for purposes of simplification.

A study of a series of alkyl substituents meta to the amine group of the dye intermediate (2-chloro-5-aminoalkylbenzene-4-sulfonic acid when coupled with beta-naphthol and recovered as a metal salt) revealed marked differences in the quality of pigment resulting from variation in the alkyl substituent.

For example, when the alkyl group was increased in size above propyl and unfortunately so in the case of n-propyl, light-fastness of the resulting pigments dropped off so as to produce products of inferior quality for pigmentary use. The n-propyl alkyl substituents are inferior in light-fastness to the Methyl and Ethyl Reds of the prior art. However, the n-propyl substituent provided outstanding quality of color, stronger in yellow undertone than Ethyl Red and quite superior in the quality of yellow undertone to Methyl Red. The homologous series above Ethyl Red appear unsuited for commercial use due to their comparatively inferior light-fastness. Among the alkyl substituents used in 2-chloro-5-aminoalkylbenzene-4-sulfonic acid and coupled with beta-naphthol were secondary butyl, isobutyl, tertiary butyl, secondary amyl and tertiary amyl groups. All were found deficient in light-fastness as pigments. It was with surprise that upon synthesizing the isopropylamine intermediate of the alkyl substituent series of intermediaite amines and diazotizing and coupling the isopropyl intermediate with beta-naphthol, that not only was the color advantage of the n-propylamine derivative retained, but light-fastness of the pigment was found to be equivalent in quality to the corresponding Methyl and Ethyl Red pigments of the prior art.

An additional advantageous characteristic of the isopropyl coupling with beta-naphthol (which is hereinafter referred to as Isopropyl Red) was found in improved transparency of the Isopropyl Red pigment over its comparable homologues when dispersed in printing ink vehicles. The quality is more pronounced in the resinated form of the barium salt of the series.

Superiority in the quality of transparency of Isopropyl Red over its lower homologues has been demonstrated as follows: The barium salt of each of the couplings, namely; Methyl Red, Ethyl Red and Isopropyl Red in their resinated form were dispersed at 40% pigment level in a high gloss lithographic varnish and at 30% pigment concentration in a long oil alkyd resin vehicle. Four drawdowns of each of the pigments were made over Morest Test Paper (Form 07P) having black and white patterns imprinted on the test paper. The first drawdown was made by means of a knife blade in direct contact with the test paper. The film of ink deposited by this technique is referred to as a "scraped film" and is equivalent to that deposited by a printing press. The second drawdown was of a 0.0015 inch film of 40% pigment in litho varnish. The third drawdown was of a 0.003 inch film of the same percent pigmentation and the fourth was a 0.005 inch thickness film at 30% pigmentation level in the alkyd varnish. Reflectance percentages over uncoated white and black areas of the test paper were found to be 100% and 0% at the vertical, respectively. Measurement of reflectance of the various drawdowns described were made with a tristimulus type filter using a Photovolt Corporation reflectance meter. The data obtained is set forth in the following table. Data from coatings over the black areas was not of interest, and has been excluded.

TABLE I

| Drawdown | Reflectance over White Areas | | |
| --- | --- | --- | --- |
| | Methyl Red | Ethyl Red | Isopropyl Red |
| 1 | 20 | 25 | 29 |
| 2 | 12 | 16 | 19 |
| 3 | 8 | 11 | 14 |
| 4 | 8 | 11 | 14 |

From the above figures it can be seen that the Isopropyl Red is considerably more transparent, for a higher percentage of light is reflected from the white base of the test paper through it than through comparable films of the other related pigments. High transparency with strong color development of Isopropyl Red is of particular value in printing ink use.

Additional advance in the art of azo pigments over the prior art has been found in that the Isopropyl Red is brighter and more strongly yellow than the alkyl substituents higher than propyl or lower than propyl, as in the methyl and ethyl homologues. Further, Isopropyl Red has been found to be resistant to fat bleeding when used in lithographic inks. Comparable inks made with Methyl Red, Ethyl Red and Isopropyl Red and printed on cellophane wrappers for bacon packaging shows definite bleed into bacon fat in the case of the Methyl and Ethyl Reds whereas the Isopropyl Red (as comparative barium metal salts) revealed acceptable bleed resistance when exposed to similar environment.

A still further advantage of Isopropyl Red was observed in flexographic printing inks and appears to be inherent. Flexographic inks, which are widely used as printing ink vehicles, are alcoholic solutions of shellac and/or other spirit soluble resins. Organic red pigments presently available, when dispersed in flexographic ink vehicles, generally produce a product ink having objectionable rheological, or flow, properties. Inks so formed are thixotropic, which is observable by sharp increase in viscosity after cessation of agitation or mixing of the ink. (A non-Newtonian flow pattern.) Further, at desirable pigment-vehicle solids ratios the viscosity of the dispersions are so great as to be objectionable. The superiority of Isopropyl Red over Methyl and Ethyl Reds in this particular is demonstrated as follows:

17.3% of the barium salt of each of the couplings identified herein as Methyl Red, Ethyl Red and Isopropyl Red were dispersed in 82.7% of a standard commercially available flexographic ink vehicle. Viscosities in poises of each of the samples of ink were determined at various shear rates by means of a Brookfield viscometer. The results are tabulated as follows:

TABLE II

| Spindle Speeds (Shear Rate) | Viscosity in Poises | | | |
| --- | --- | --- | --- | --- |
| | 2 R. P. M. | 4 R. P. M. | 10 R. P. M. | 20 R. P. M. |
| Methyl Red | 1,470 | 480 | 216 | 119 |
| Ethyl Red | 1,230 | 401 | 182 | 101 |
| Isopropyl Red | 240 | 125 | 56 | 32 |

The above table demonstrates both an improved initial low viscosity at any given shear rate, as well as a product having less viscosity change as the shear rate is either increased or decreased, or less thixotropic character is developed in use of Isopropyl Red than in the prior art homologues of Isopropyl Red. Such remarkable changes in the flow characteristics could not be anticipated by the realtively minor change in the nature of the alkyl substituent of the amine intermediate.

Economic advantages are also inherent in production of Isopropyl Red. Present market conditions show toluene (Methyl Red base raw material) to be five cents per pound, ethyl benzene (Ethyl Red base raw material) to be twenty cents per pound and isopropyl benzene (Isopropyl Red base raw material) to be eleven cents per pound. Assuming equivalent yields in all cases, Isopropyl Red has obvious advantage over Ethyl Red. However, yields of the isopropyl intermediate are unexpectedly high and sufficiently better than obtained in the case of Methyl Red to offset present market differentials in raw material cost. Thus, the new pigment herein disclosed not only provides an improved pigment as to a number of chromatic qualities, but one that can be manufactured at a competitive cost with the least expensive of the prior art homologues, and at a favorable price differential with relation to the remaining homologue.

Still another unexpected advantage over the prior art Methyl Red pigment has been observed in resistance to water bleed, as experienced from printing upon frozen food packages. The Isopropyl Red pigment is resistant to water bleed so that it may be used successfully in printing of packages for frozen food use.

Heretofore, water bleeding has prevented use of Methyl Red in such packaging, for the moisture associated with frozen food packages has been sufficient to cause bleeding of the red color over onto associated packages.

The following examples illustrate suitable methods for manufacture of the 2-chloro-5-aminoisopropylbenzene-4-sulfonic acid intermediate and certain useful metal salts of the coupling of said intermediate with beta-naphthol. Other methods are not precluded and other alkali or alkaline earth salts may be manufactured by obvious changes in raw materials employed in processes illustrated. Parts are by weight unless otherwise noted.

*Example I*

PREPARATION OF THE INTERMEDIATE 120 parts of isopropylbenzene are charged into a jacketed kettle equipped with reflux condenser and agitator. The charge is heated to 100° C. and 200 parts of 99% sulfuric acid added over a period of one-half hour while maintaining said temperature. After the acid addition, the temperature is brought to and maintained at 105° C. for one hour and then to 125° C. over one-half hour. If the usual solubility test indicates the reaction to be incomplete, heating at 125° C. is resumed until sulfonation is complete.

After cooling to 45° C., the reaction mixture containing isopropylbenzene-p-sulfonic acid is subjected to the action of chlorine gas in the presence of a suitable chlorination-catalyst, such as anhydrous ferric chloride. The quantity of chlorine used is somewhat in excess of theoretical for monochlorination and it is added over a period of about six hours. The temperature is maintained at 40°–45° C. throughout the reaction period.

The reaction mixture, containing o-chloro-isopropyl-benzene-p-sulfonic acid, is heated to 50° C. and 108 parts of commercial nitrating acid (58% nitric acid) are added over a period of about four hours. The temperature of reaction is maintained between 50° C. and 55° C. The mixture is allowed to stir about one-half hour after the acid addition is completed, whereupon it is drowned in 2000 parts of cold water.

The resulting liquor containing the nitro compound, is "limed out" with about 220 parts of lime. During this step the temperature should not exceed 95° C. The precipitated calcium sulfate is filtered off and washed with hot water.

The combined nitro compound liquor and washings are subjected to reduction with iron and hydrochloric acid. 166 parts of iron powder and 30 parts of acid are required and temperature of reaction is held between 90° C. and 95° C. When reduction is complete, the mixture is neutralized to a pH of 7.5 to 8.0 and filtered hot to remove iron oxides. The filtrate is clarified by treating with activated carbon and refiltering.

2-chloro-5-amino-isopropylbenzene-4-sulfonic acid is liberated from the filtrate by acidifying with hydrochloric acid to a pH of 1.2. The amine is recovered by filtration, washed with cold water, and dried at 65° C.

*Example II*

PREPARATION OF THE B-NAPHTHOL COUPLING

To a solution of 60 parts of 28% ammonium hydroxide in 1800 parts of water are added 125 parts of 2-chloro-5-aminoisopropylbenzene-4-sulfonic acid. Solution of the amine is effected by stirring. 35 parts of sodium nitrite are added and the solution cooled to 5° C. by adding ice. Under good agitation 140 parts of 32% hydrochloric acid are added, thus diazotizing the amine.

In a separate vessel 75 parts of beta-naphthol are dissolved in 500 parts of water with 24 parts sodium hydroxide and 3 parts sulfonated castor oil. This solution is added to 3000 parts water containing 60 parts of 32% hydrochloric acid. Thereupon 72 parts of sodium bicarbonate are added.

The diazotized amine is added to the treated beta-naphthol slurry, and complete coupling occurs during stirring over about a 45 minute period. The resultant colored compound is heated to 70° C. and filtered. The sodium salt may be recovered at this point. However, it is preferred to reslurry the sodium salt in 6000 parts of water and form the barium salt of the coupling by adding 62 parts of barium chloride dihydrate and raising the temperature to the boil. The barium product is then filtered off, washed, dried and pulverized, and is a brilliant yellow-red pigment.

Example III

RESINATED FORM OF ISOPROPYL RED

The resinated form of the pigment is produced by modification of the procedure of Example II as follows: After reslurrying the sodium salt of the coupling, a solution is prepared by dissolving 36 parts of rosin in 400 parts water containing 4 parts of sodium hydroxide. This solution is added to the reslurried sodium salt of the coupling. 90 parts of barium chloride dihydrate are added subsequently thereto and the admixture brought to a boil. The recovered resinated barium salt is deeper in masstone and has a brighter and yellower print-tone and a higher gloss than the non-resinated product.

Example IV

The calcium salt is prepared by a procedure similar to that described in manufacture of the barium salt except that 40 parts of calcium chloride dihydrate are substituted for the 62 parts barium salt in Example II. The calcium salt is bluer in shade than the barium salt.

As is established in the azo pigment art, organic pigments resulting from the processes described above may be modified in hue and other characteristics by changes in processing techniques. Modifications of the pigmentary products described herein by these techniques are within the skill of the art and contemplated as applicable to the novel coupling described above.

The azo pigments described may be illustrated by the following structural formula

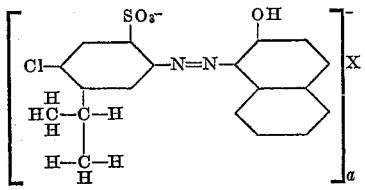

wherein X is a cation selected from the group consisting of the alkali and alkaline earth metals and $a$ is one when X is an alkali metal and $a$ is two when X is an alkaline earth metal.

What we claim is:

1. A compound of the formula:

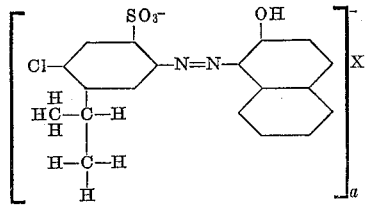

wherein X is a cation selected from the group consisting of the alkali and alkaline earth metals and $a$ is one when X is an alkali metal and $a$ is two when X is an alkaline earth metal.

2. A product according to claim 1 where the metal cation is an alkali metal.

3. A product according to claim 1 where the metal cation is sodium.

4. A product according to claim 1 where the metal cation is an alkaline earth metal.

5. A product according to claim 1 where the metal cation is barium.

6. A product according to claim 1 where the metal cation is calcium.

References Cited in the file of this patent

UNITED STATES PATENTS

| | | |
|---|---|---|
| 733,280 | Schirmacher | July 7, 1903 |
| 1,314,921 | Andrews | Sept. 2, 1919 |
| 2,598,483 | Adams | May 27, 1952 |